Aug. 31, 1926.
M. KINNEBREW ET AL
1,597,982
WHEEL HUB
Filed August 24, 1923
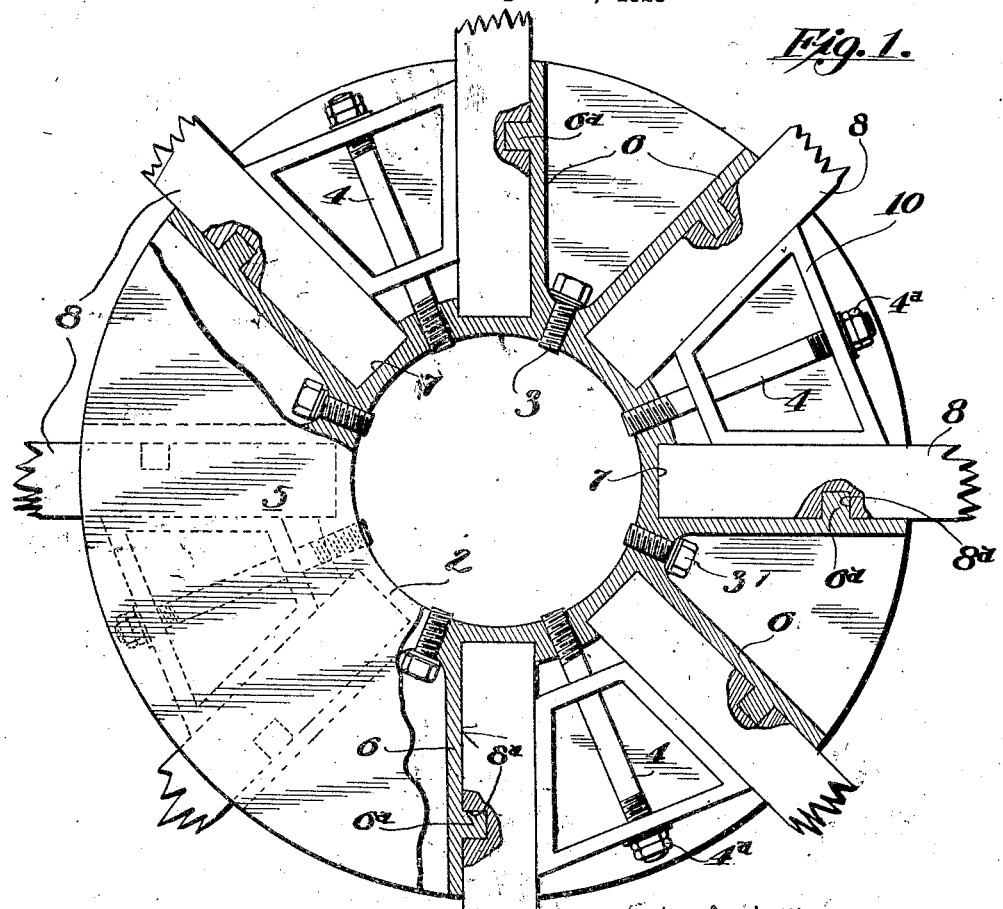
Fig. 1.
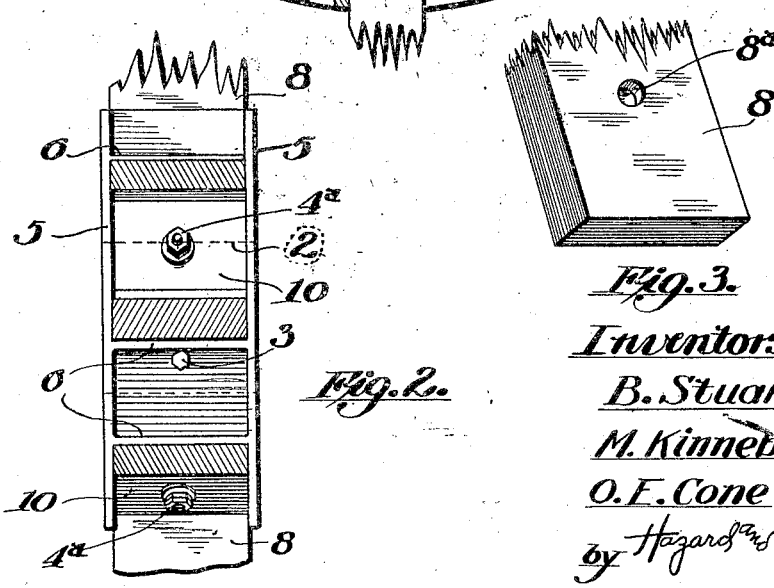
Fig. 2.
Fig. 3.
Inventors
B. Stuart
M. Kinnebrew
O. F. Cone
by Hazard and Miller
Attys Patented Aug. 31, 1926.

1,597,982

UNITED STATES PATENT OFFICE.

MARCUS KINNEBREW AND BABERS STUART, OF FELLOWS, AND OSCAR E. CONE, OF TAFT, CALIFORNIA.

WHEEL HUB.

Application filed August 24, 1923. Serial No. 659,165.

This invention relates to machine elements and more particularly to wheel hubs.

An object of the invention is to provide a unitary cast metal hub to be used in the construction of calf wheels and bull wheels.

An object is to provide a wheel hub of great strength and one requiring less labor in the assembly of parts for construction of the wheel.

An object is to provide a wheel hub of simple design and in which securing bolts and nuts are easily accessible to facilitate assembly and separation and to facilitate tightening up the parts and keep the wheel in good condition at all times.

An object is to provide an interchangeable wedging means adapted to be inserted between contiguous spokes of a pair.

Other objects and advantages will be made manifest in the following specification of an embodiment of the invention illustrated in the accompanying drawings, wherein:

Fig. 1 is a section perpendicular to the axis of the hub.

Fig. 2 is an edge view of the hub showing applied spokes in cross section.

Fig. 3 is a perspective of a butt end of one of the spokes.

The hub of the present invention includes a central cylinder box or sleeve 2 of such diameter as to snugly fit an inserted shaft upon which it may be shrunk and upon which it may be further secured as by radial set screws 3 and by radial rods or stud bolts 4.

Each end of the hub box 2 is provided with a disc or end plate 5 of any suitable diameter and these are transversely connected by approximately radial webs 6 between contiguous pairs of which the set screws 3 have their heads exposed.

The periphery of the box 2 is provided with transverse recessed seats 7 having a width approximating the thickness of spokes 8 adapted to be inserted in radial position and secured solidly against the webs 6.

A feature of the invention is to secure interlock between the spokes 8 and the webs 6 and this is accomplished by providing lugs $6^a$ on faces of the webs and by recessing faces of the spokes 8 as at $8^a$ to receive the lugs $6^a$ after the inner ends of the spokes have been jammed in their seats 7 and then thrown so as to bring the lug apertures $8^a$ into register with the lugs $6^a$. This provides a substantial means for preventing outward movement of the spokes after they have been applied.

A feature of the invention is to provide an extremely simple, practicable and effective means for fastening the spokes 8 to prevent looseness and for solidly holding them in applied position in the hub. As here shown, such means includes a substantially wedge-shaped frame 10 of suitable proportions and dimensions to obtain the desired strength. The converging opposite faces of the wedge frame 10 are adapted to bear upon contiguous faces of the inserted spokes 8 and the frames 10 have their inner and outer walls perforated to receive the radial rods 4 whose outer ends are threaded to receive nuts $4^a$ and which are adapted to bind down against the outer member of the contiguous frame and thus force the frame radially inwardly and jam it against the spokes 8.

It will be seen from the above that the invention consists of an extremely simple and substantial organization in which all of the fastening nuts, bolts and screws are readily accessible at any time to enable the quick tightening up and setting of the wedges and spokes.

What is claimed is:

1. A wheel hub comprising a sleeve adapted to be mounted about a shaft, means for securing said sleeve to the shaft, approximately radial webs secured to said sleeve, lugs formed upon said webs, spokes disposed adjacent said webs having recesses therein adapted to receive said lugs, wedge devices disposed between adjacent spokes adapted to maintain said spokes adjacent their respective webs, and means for drawing said wedge devices toward said sleeve.

2. A wheel hub comprising a sleeve adapted to be mounted about a shaft, means for securing said sleeve to the shaft, approximately radial webs secured to said sleeve, lugs formed upon said webs, spokes disposed adjacent said webs having recesses therein adapted to receive said lugs, wedge devices disposed between adjacent spokes adapted to maintain said spokes adjacent their respective webs, means for drawing said wedge devices toward said sleeve, and flanges secured adjacent each end of said sleeve and bearing upon the sides of said spokes.

3. A wheel hub comprising a sleeve adapted to be slipped on to a shaft, means for securing said sleeve against rotation upon the shaft, flanges formed integral with said sleeve adjacent the ends thereof, approximately radial webs integral with said sleeve and flanges, each web together with the adjacent web constituting a pair, spokes disposed adjacent the opposed faces of the webs forming each pair, wedge devices disposed between each pair of spokes engaging the opposed faces thereof, so as to maintain said spokes adjacent their respective webs, and means for tightening said wedge devices toward said sleeve.

4. A wheel hub comprising a sleeve adapted to be slipped on to a shaft, means for securing said sleeve against rotation upon the shaft, flanges formed integral with said sleeve adjacent the ends thereof, approximately radial webs integral with said sleeve and flanges, each web together with the adjacent web constituting a pair, spokes disposed adjacent the opposed faces of the webs forming each pair, wedge devices disposed between each pair of spokes engaging the opposed faces thereof, so as to maintain said spokes adjacent their respective webs, means for tightening said wedge devices toward said sleeve, and lugs formed upon said webs receivable in recesses formed in said spokes.

5. A wheel hub comprising a sleeve adapted to be slipped on to a shaft, means for securing said sleeve against rotation upon the shaft, flanges formed integral with said sleeve adjacent the ends thereof, approximately radial webs integral with said sleeve and flanges, each web together with the adjacent web constituting a pair, spokes disposed adjacent the opposed faces of the webs forming each pair, wedge devices disposed between each pair of spokes engaging the opposed faces thereof, so as to maintain said spokes adjacent their respective webs, means for tightening said wedge devices toward said sleeve, and recesses formed in said sleeve adjacent said webs for receiving the inner ends of said spokes.

In testimony whereof we have signed our names to this specification.

MARCUS KINNEBREW.
OSCAR E. CONE.
BABERS STUART.